(12) United States Patent
Martin et al.

(10) Patent No.: US 9,122,488 B2
(45) Date of Patent: Sep. 1, 2015

(54) IDENTIFICATION AND TRANSLATION OF PROGRAM CODE EXECUTABLE BY A GRAPHICAL PROCESSING UNIT (GPU)

(71) Applicant: The MathWorks, Inc., Natick, MA (US)

(72) Inventors: Jocelyn Luke Martin, Burwell (GB); Joseph F. Hicklin, Upton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/317,066

(22) Filed: Jun. 27, 2014

(65) Prior Publication Data

US 2014/0310695 A1   Oct. 16, 2014

Related U.S. Application Data

(63) Continuation of application No. 12/894,479, filed on Sep. 30, 2010, now Pat. No. 8,769,510.

(60) Provisional application No. 61/322,087, filed on Apr. 8, 2010.

(51) Int. Cl.
*G06F 9/45* (2006.01)
(52) U.S. Cl.
CPC . *G06F 8/41* (2013.01); *G06F 8/456* (2013.01)
(58) Field of Classification Search
None
See application file for complete search history.

(56) References Cited

U.S. PATENT DOCUMENTS

| | | | |
|---|---|---|---|
| 7,814,486 B2 * | 10/2010 | Papakipos et al. | 717/140 |
| 8,769,510 B2 | 7/2014 | Martin et al. | |
| 2010/0250564 A1 * | 9/2010 | Agarwal et al. | 707/756 |

OTHER PUBLICATIONS

Wikipedia, "Jacket (software)", http://en.wikipedia.org/wiki/Jacket_(software), Jun. 27, 2010, 3 pages.
NVIDIA Corporation, "White Paper—Accelerating MATLAB with CUDA™ Using MEX Files", Sep. 2007, 15 pages.
Gp-you.org, "GPUmat User Guide", Version 0.25, Apr. 2010, 246 pages.

* cited by examiner

*Primary Examiner* — Qamrun Nahar
(74) *Attorney, Agent, or Firm* — Harrity & Harrity, LLP

(57) ABSTRACT

A device receives program code, and receives size/type information associated with inputs to the program code. The device determines, prior to execution of the program code and based on the input size/type information, a portion of the program code that is executable by a graphical processing unit (GPU), and determines, prior to execution of the program code and based on the input size/type information, a portion of the program code that is executable by a central processing unit (CPU). The device compiles the GPU-executable portion of the program code to create a compiled GPU-executable portion of the program code, and compiles the CPU-executable portion of the program code to create a compiled CPU-executable portion of the program code. The device provides, to the GPU for execution, the compiled GPU-executable portion of the program code, and provides, to the CPU for execution, the compiled CPU-executable portion of the program code.

20 Claims, 10 Drawing Sheets

IDENTIFICATION AND TRANSLATION OF PROGRAM CODE EXECUTABLE BY A GRAPHICAL PROCESSING UNIT (GPU)

RELATED APPLICATIONS

This application is a continuation of U.S. patent application Ser. No. 12/894,479, filed Sep. 30, 2010 (now U.S. Pat. No. 8,769,510), and claims priority under 35 U.S.C. §119 based on U.S. Provisional Patent Application No. 61/322,087, filed Apr. 8, 2010, the entire contents of which are hereby incorporated by reference. This application is also related to U.S. patent application Ser. No. 12/894,544, (now U.S. Pat. No. 8,533,697), entitled "GRAPHICAL PROCESSING UNIT (GPU) ARRAYS," filed Sep. 30, 2010, the disclosure of which is incorporated by reference herein in its entirety. This application is further related to U.S. patent application Ser. No. 12/894,547 (now U.S. Pat. No. 8,547,500), entitled "SAVING AND LOADING GRAPHICAL PROCESSING UNIT (GPU) ARRAYS," filed Sep. 30, 2010, the disclosure of which is incorporated by reference herein in its entirety.

BACKGROUND

Graphical processing units (GPUs) provide high computation capabilities at lower prices than comparable central processing units (CPUs). For example, one particular GPU can compute one trillion floating point operations in a single second (i.e., one teraflop). GPUs may be provided in a variety of devices (e.g., desktop computers) and/or systems (e.g., a high performance computing center) to provide improved numerical performance.

A GPU may include a number of characteristics. For example, a GPU may include many vector processing elements (e.g., cores) operating in parallel, where each vector core addresses a separate on-device memory. There is high memory bandwidth between the on-device memories and the vector cores, and memory latency is relatively large (e.g., four-hundred clock cycles). A GPU may provide zero overhead thread scheduling (e.g., which enables algorithms with high thread counts); however, the GPU may include limited support for communications between threads. A relatively low memory bandwidth is provided between the GPU's device memory and host memory. A GPU also provides limited support for general-purpose programming constructs (e.g., code executing on the GPU cannot allocate memory itself, this must be accomplished by a host CPU).

These characteristics mean that programming for the GPU is not straightforward and highly parallel algorithms need to be created for the GPU. A typical high-level program will be hosted on a CPU that invokes computational kernels on the GPU in a sequence to achieve a result. Because of the relatively low bandwidth available to transfer data to and from the GPU's own memory, efficient programs may transfer data only when necessary. Furthermore, in such high-level programs, GPU-executable programming code is not compiled prior to execution, but rather is compiled during execution (e.g., when such code is needed by the CPU).

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may identify and translate programming (or program) code executable by a GPU. The program code may include program code generated by a technical computing environment (described herein). The program code may be compiled to an assembly code (e.g., that may be understood by the GPU) that is executed by the GPU with particular thread allocation policies. Examples of such program code include: element-wise operations performed on large arrays, where each thread of the GPU operates on a single element of the overall array; parallel-for loops where each iteration of the parallel-for loop executes on a different thread of the GPU (thus many iterations may execute simultaneously); large-scale numeric functions (e.g., matrix division, fast Fourier transforms, matrix multiplication, etc.); etc.

In one example implementation, the systems and/or methods may receive program code created using a technical computing environment, and may receive size and type information associated with inputs to the program code. The systems and/or methods may perform a static analysis of the program code to identify portions of the program code, and may determine, prior to execution of the program code and based on the input size and type information, a first portion of the program code to be executed by a graphical processing unit (GPU). The systems and/or methods may determine, prior to execution of the program code and based on the input size and type information, a second portion of the program code to be executed by a central processing unit (CPU), and may compile the first portion of the program code and the second portion of the program code. The systems and/or methods may provide, to the GPU for execution, the compiled first portion of the program code, and may provide, to the CPU for execution, the compiled second portion of the program code.

The terms a "portion" or a "program portion," as used herein, are to be broadly interpreted to include contiguous portions of program code and/or non-contiguous portions of program code.

Example Network Arrangement

Figure 1:
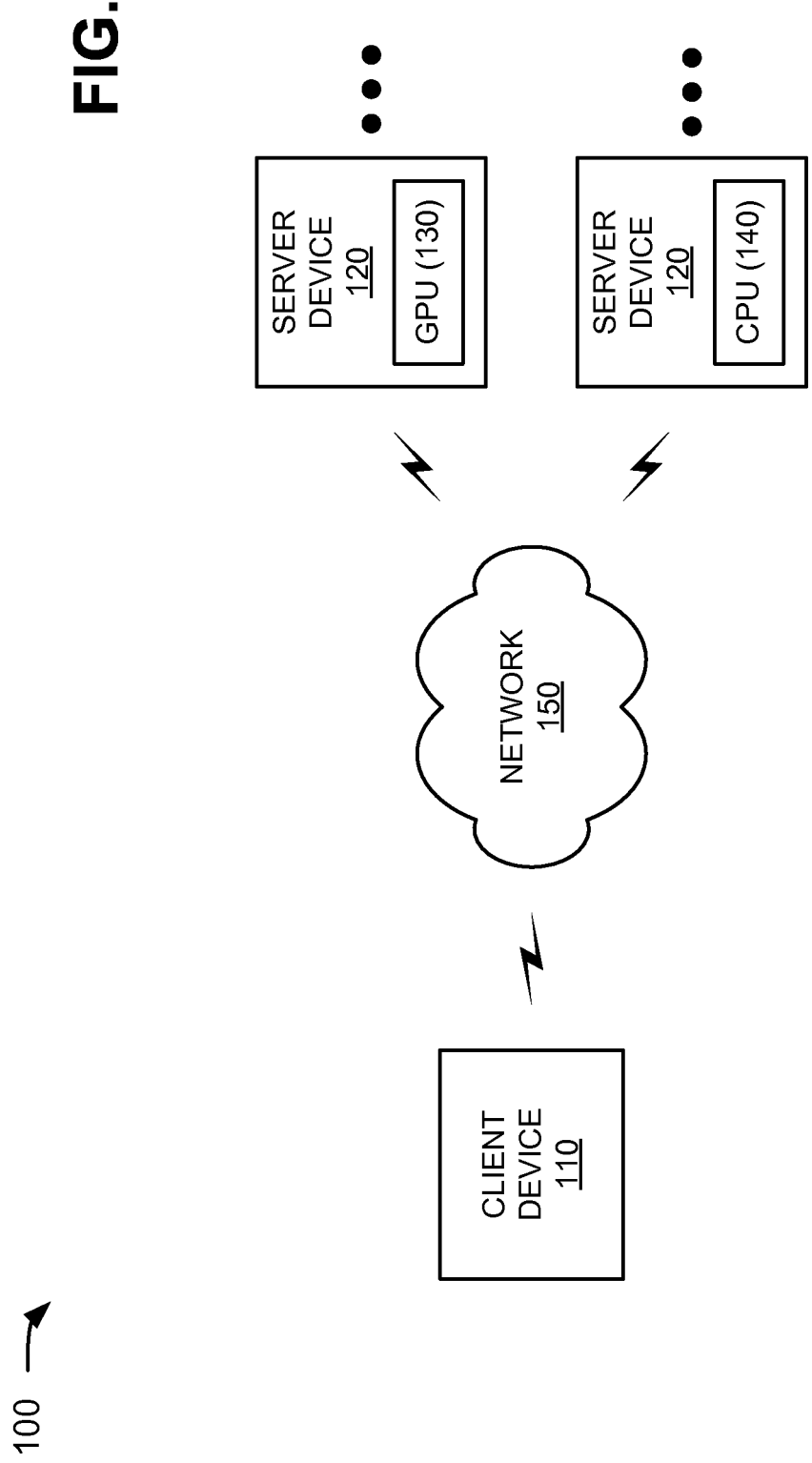
FIG. 1 is a diagram of an example network in which systems and/or methods described herein may be implemented.

FIG. 1 is a diagram of an example network 100 in which systems and/or methods described herein may be implemented. As illustrated, network 100 may include a client device 110 interconnected with one or more server devices 120 (e.g., that include GPUs 130 and/or CPUs 140) via a network 150. Components of network 100 may interconnect via wired and/or wireless connections. A single client device 110, two server devices 120, a single GPU 130, a single CPU 140, and a single network 150 have been illustrated in FIG. 1 for simplicity. In practice, there may be more client devices 110, server devices 120, GPUs 130, CPUs 140, and/or networks 150. In one example implementation, server devices 120 and network 150 may be omitted, and GPU(s) 130 and/or CPU(s) 140 may be provided within client device 110 or attached locally to client device 110. In other implementations, GPU 130 and CPU 140 may be included in a single server device 120.

Client device 110 may include one or more devices that are capable of communicating with server devices 120 via network 150. For example, client device 110 may include a laptop computer, a personal computer, a tablet computer, a desktop computer, and/or other computation and/or communication devices.

In one example implementation, client device 110 may receive or generate program code created using a TCE (e.g., provided in client device 110 or another device), and may receive size and type information associated with inputs to the program code. Client device 110 may perform a static analysis of the program code to identify portions of the program code, and may determine, prior to execution of the program code and based on the input size and type information, a first portion of the program code to be executed by GPU 130. Client device 110 may determine, prior to execution of the program code and based on the input size and type information, a second portion of the program code to be executed by CPU 140, and may compile the first portion of the program code and the second portion of the program code. Client device 110 may provide, to GPU 130 for execution, the compiled first portion of the program code, and may provide, to CPU 140 for execution, the compiled second portion of the program code.

Server device 120 may include one or more server devices, or other types of computation or communication devices, that gather, process, and/or provide information in a manner described herein. Server device 120 may include a device that is capable of communicating with client device 110 (e.g., via network 150). In one example, server device 120 may include one or more laptop computers, personal computers, workstation computers, etc.

GPU 130 may include one or more specialized microprocessors that offload and accelerate three-dimensional or two-dimensional processing, such as graphics rendering, from a microprocessor. GPU 130 may include a highly parallel structure that makes GPU 130 more effective than general-purpose CPUs for a range of complex algorithms. In one example implementation, GPU 130 may receive the compiled first portion of the program code (e.g., compiled GPU-executable code) from client device 110, and may execute the compiled first portion of the program code to produce results. GPU 130 may provide the results to client device 110.

CPU 140 may include one or more processors, microprocessors, or other types of processing units that may interpret and execute instructions. In one example implementation, CPU 140 may receive the compiled second portion of the program code (e.g., compiled CPU-executable code) from client device 110, and may execute the compiled second portion of the program code to produce results. CPU 140 may provide the results to client device 110.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Example Device Architecture

Figure 2:
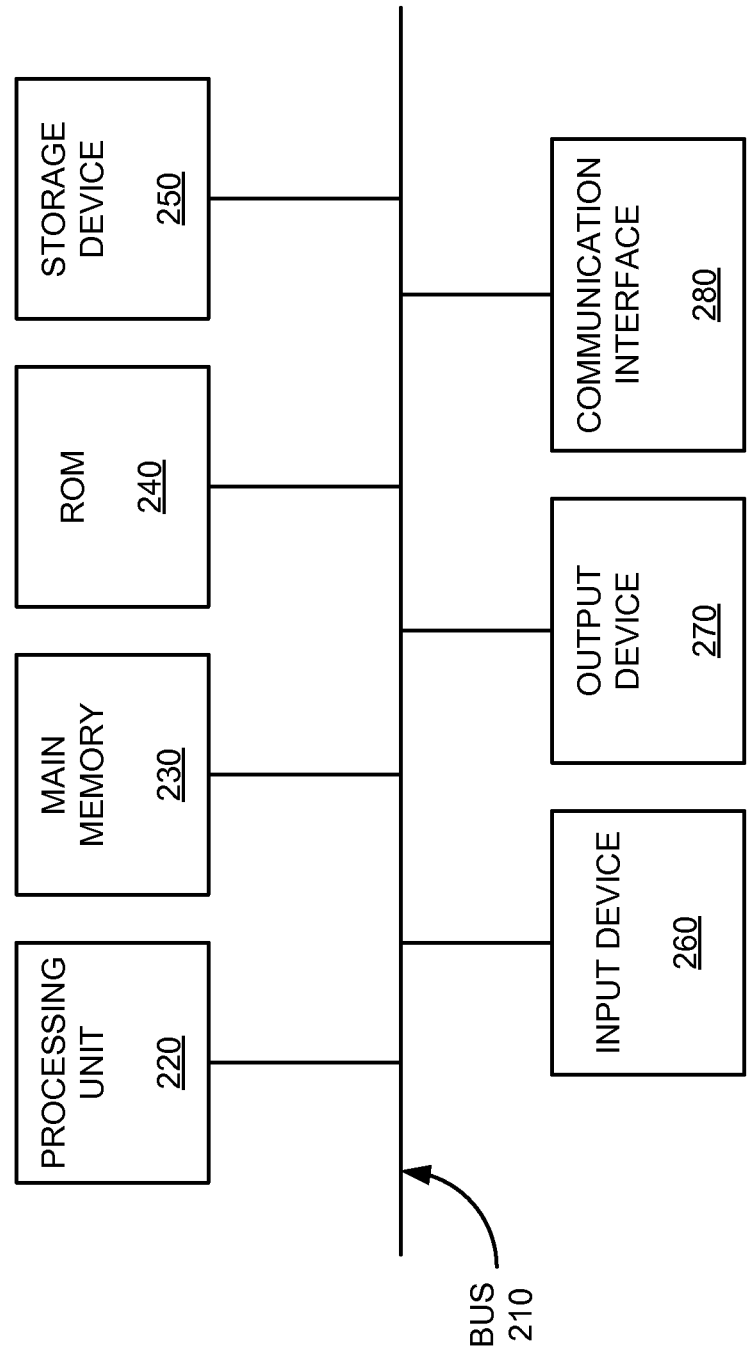
FIG. 2 is a diagram of example components of one or more of the devices of the network depicted in FIG. 1.

FIG. 2 is an example diagram of a device 200 that may correspond to one or more of the devices of network 100. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits a user to input information to device 200, such as a keyboard, a mouse, a pen, a microphone, voice recognition and/or biometric mechanisms, a remote control, a touch screen, etc. Output device 270 may include a mechanism that outputs information to the user, including a display, a printer, a speaker, etc. Communication interface 280 may include any transceiver-like mechanism that enables device 200 to communicate with other devices, networks, and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, and/or additional components than depicted in FIG. 2. Alternatively, or additionally, one or more components of device 200 may perform one or more other tasks described as being performed by one or more other components of device 200.

Example Network Interactions

Figure 3:
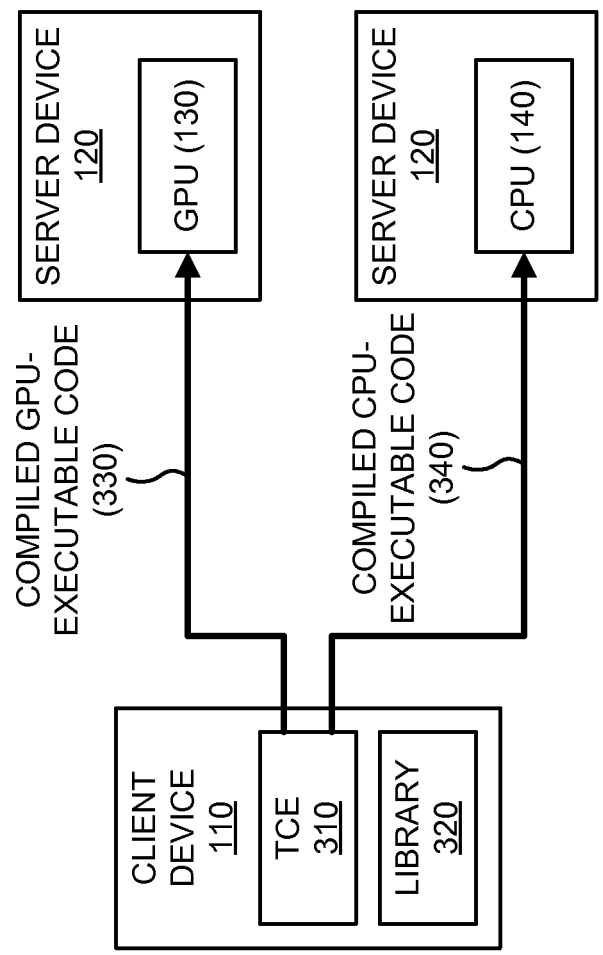
FIG. 3 is a diagram of example interactions between devices of an example portion of the network depicted in FIG. 1.

FIG. 3 is a diagram of example interactions between devices of an example portion 300 of network 100. As illustrated, example network portion 300 may include client device 110, server device 120 (with GPU 130), and server device 120 (with CPU 140). Client device 110, server devices 120, GPU 130, and CPU 140 may include the features described above in connection with one or more of FIGS. 1 and 2.

As further shown in FIG. 3, client device 110 may include a TCE 310 and a library 320. In one implementation, TCE 310 and/or library 320 may be provided within a computer-readable medium of client device 110 (e.g., in ROM 240 and/or storage device 250). In other implementations, TCE 310 and/or library 320 may be provided in another device that is accessible by client device 110 (e.g., via communication interface 280).

TCE 310 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 310 may include a dynamically-typed programming language (e.g., the M language or MATLAB® language) that can be used to express problems and/or solutions in mathematical notations. For example, TCE 310 may use an array as a basic element, where the array may not require dimensioning. In addition, TCE 310 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 310 may further provide mathematical functions and/or graphical tools (e.g., for creating plots, surfaces, images, volumetric representations, etc.). In one implementation, TCE 310 may provide these functions and/or tools using toolboxes (e.g., toolboxes for signal processing, image processing, data plotting, parallel processing, etc.). In another implementation, TCE 310 may provide these functions as block sets. In still another implementation, TCE 310 may provide these functions in another way, such as via a library, etc.

TCE 310 may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Library 320 may include hardware or a combination of hardware and software that may operate with TCE 310 to perform certain operations. For example, in one implementation, library 320 may include functions to perform certain operations (e.g., signal processing, image processing, parallel programming, data display, etc.) in a text-based environment. In another implementation, library 320 may include graphical representations (e.g., blocks, icons, images, etc.) to perform certain operations in a graphically-based environment (e.g., a gain block, a source block, a filter block, a discrete event generator block, etc.). In still other implementations, library 320 may perform other operations using text, graphics, etc. Library 320 may include code segments or blocks that may be used to help allocate code to a GPU or CPU and to perform desired operations on the GPU or CPU, such as matched filtering, fast Fourier transforms (FFTs), image processing, etc.

In one example implementation, client device 110 may receive (or generate) program code using TCE 310, and may receive size and type information associated with inputs to the program code. Client device 110 may perform a static analysis of the program code to identify portions of the program code, and may determine, prior to execution of the program code and based on the input size and type information, a first portion of the program code to be executed by GPU 130. Client device 110 may determine, prior to execution of the program code and based on the input size and type information, a second portion of the program code to be executed by CPU 140. Client device 110 may compile the first portion of the program code to produce compiled GPU-executable code 330 (e.g., assembly code that may be understood by GPU 130), and may compile the second portion of the program code to produce compiled CPU-executable code 340 (e.g., assembly code that may be understood by CPU 140). As shown in FIG. 3, client device 110 may provide, to GPU 130 for execution, compiled GPU-executable code 330, and may provide, to CPU 140 for execution, compiled CPU-executable code 340.

GPU 130 may receive compiled GPU-executable code 330 from client device 110, and may execute compiled GPU-executable code 330 to produce results. GPU 130 may provide the results to client device 110. CPU 140 may receive compiled CPU-executable code 340 from client device 110, and may execute compiled CPU-executable code 340 to produce results. CPU 140 may provide the results to client device 110.

Although FIG. 3 shows example devices of network portion 300, in other implementations, network portion 300 may include fewer devices, different devices, differently arranged devices, and/or additional devices than depicted in FIG. 3. Alternatively, or additionally, one or more devices of network portion 300 may perform one or more other tasks described as being performed by one or more other devices of network portion 300.

Example Technical Computing Environment

Figure 4:
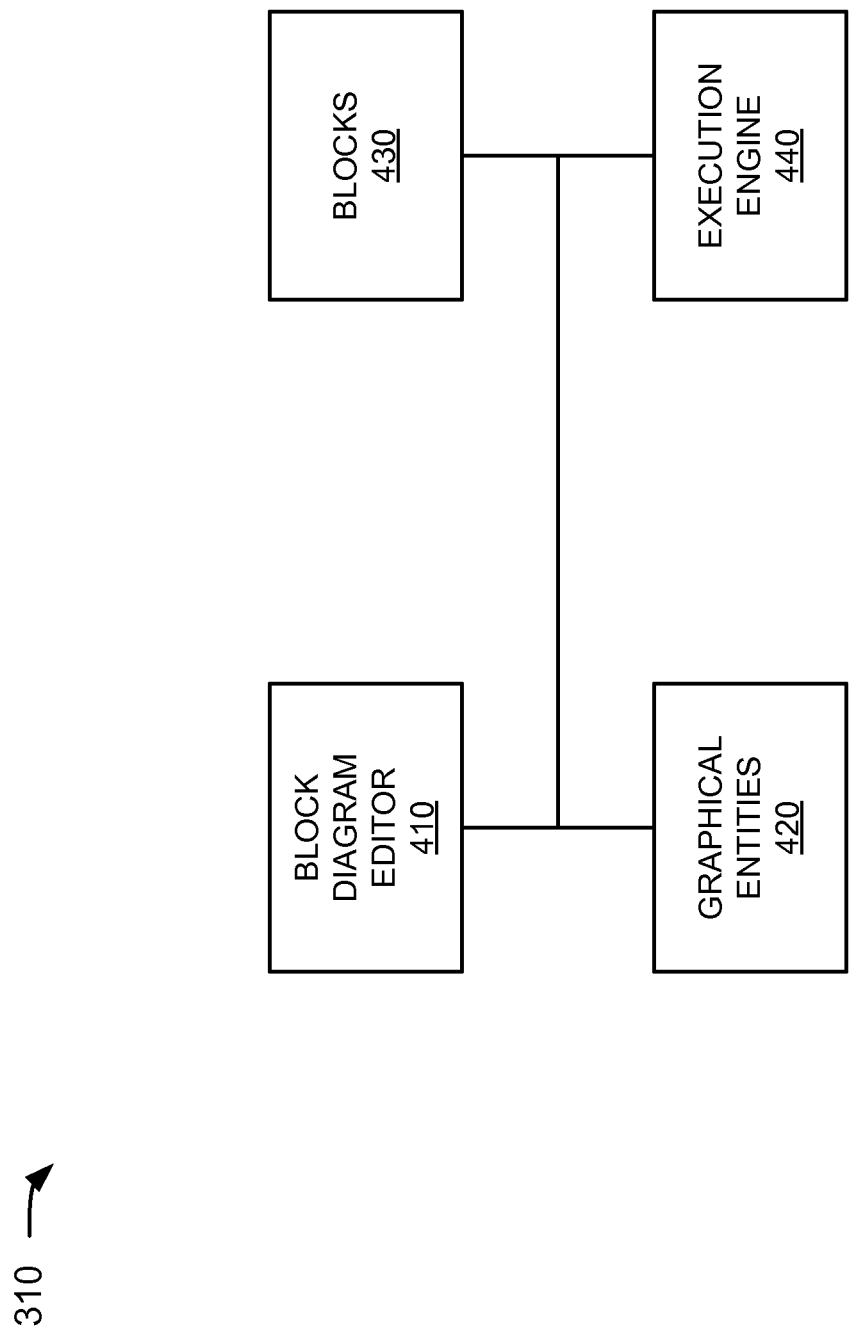
FIG. 4 is a diagram of example functional components of a technical computing environment that may be used by a client device of FIGS. 1 and 3.

FIG. 4 is a diagram of example functional components TCE 310. In one implementation, the functions described in connection with FIG. 4 may be performed by one or more components of device 200 (FIG. 2). As shown in FIG. 4, TCE 310 may include a block diagram editor 410, graphical entities 420, blocks 430, and/or an execution engine 440.

Block diagram editor 410 may include hardware or a combination of hardware and software that may graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface with a set of commands may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model. In one implementation, graphical entities 420 and/or blocks 430 may be moved from library 320 to block diagram editor 410 by a user.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 110) to implement the functionality specified by the model. Further details of execution engine 440 are provided below in connection with, for example, FIGS. 5 and 6.

Although FIG. 4 shows example functional components of TCE 310, in other implementations, TCE 310 may include fewer functional components, different functional components, differently arranged functional components, and/or additional functional components than depicted in FIG. 4. Alternatively, or additionally, one or more functional components of TCE 310 may perform one or more other tasks described as being performed by one or more other functional components of TCE 310.

Example Execution Engine

Figure 5:
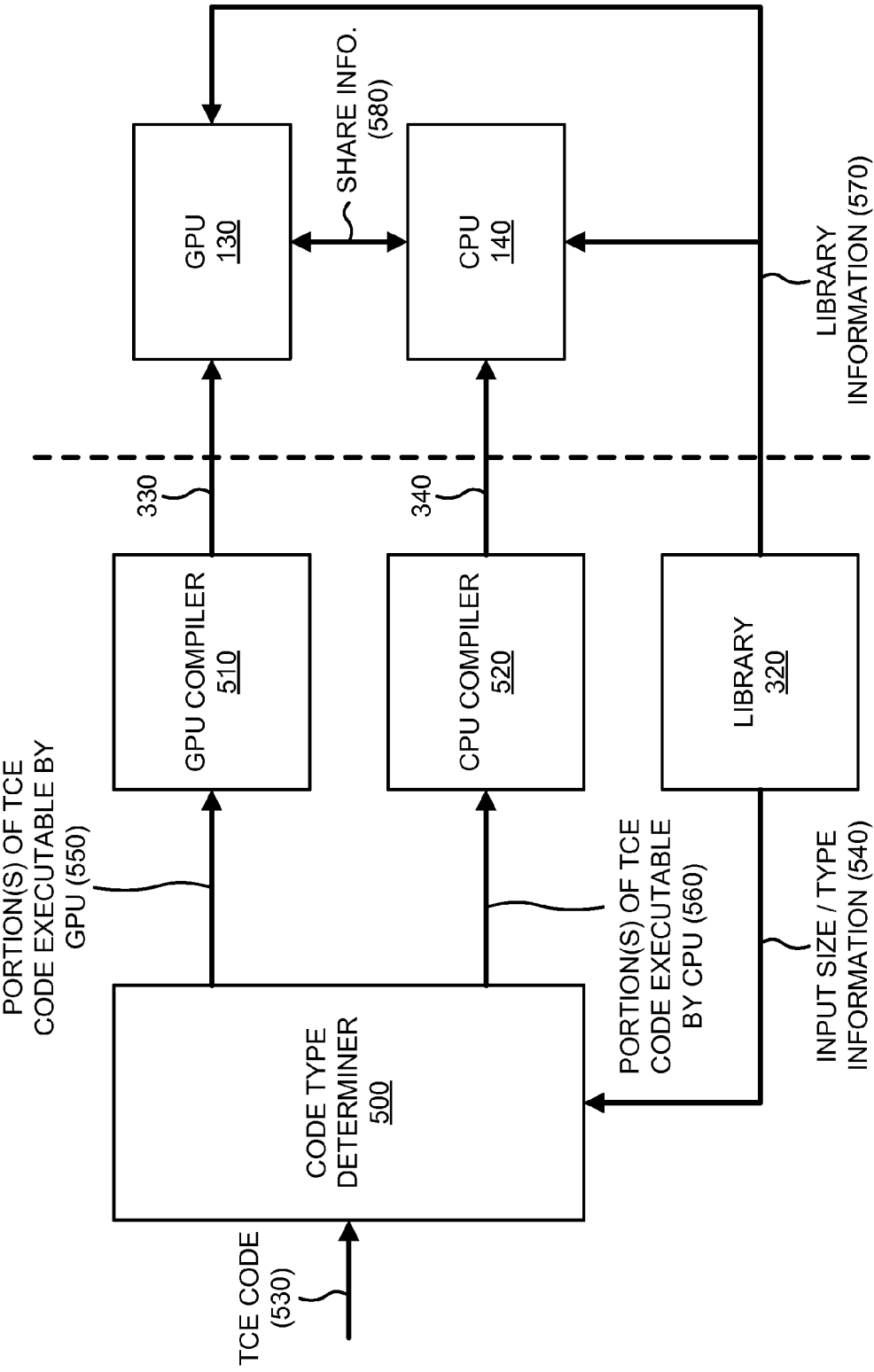
FIG. 5 is a diagram of example functional components of an execution engine of the technical computing environment depicted in FIG. 4.

FIG. 5 is a diagram of example functional components of execution engine 440 of TCE 310. In one implementation, the functions described in connection with FIG. 5 may be performed by one or more components of device 200 (FIG. 2). As shown in FIG. 5, execution engine 440 may include a code type determiner 500, a GPU compiler 510, and a CPU compiler 520. As further shown in FIG. 5, the functional components of execution engine 440 may interact with GPU 130, CPU 140, and/or library 320. GPU 130, CPU 140, and library 320 may include the features described above in connection with one or more of FIGS. 1-4.

Code type determiner 500 may include hardware or a combination of hardware and software that may receive TCE code 530 (e.g., generated by TCE 310) and may receive, from library 320, size and/or type information 540 associated with input variables of TCE code 530. TCE code 530 may be program code that includes portion(s) more efficiently executed by GPU 130, as compared to executing the portion(s) on CPU 140, and portion(s) more efficiently executed by CPU 140. In one example, input size/type information 540 may include inputs to functions of TCE code 530. Code type determiner 500 may determine which portions of TCE code 530 are more efficiently executed by GPU 130, and may determine which portions of TCE code 530 are more efficiently executed by CPU 140. Code type determiner 500 may make these determinations prior to execution of TCE code 530. Code type determiner 500 may also make these determinations on portions of TCE code 530 that have not been executed (e.g., even though other portions of TCE code 530 have been executed). In one implementation, code type determiner 500 may utilize a static analysis (e.g., an abstract syntax tree to break TCE code 530 into recognizable portions) and input size/type information 540 to determine if a portion of TCE code 530 is more efficiently executed by GPU 130 or more efficiently executed by CPU 140.

In one example implementation, code type determiner 500 may compare a size (e.g., of variables) of each portion of TCE code 530 to a size threshold, and may compare a degree of parallelism (e.g., how many parallel constructs are included) of each portion of TCE code 530 to a degree of parallelism threshold. For example, with regard to the comparison to the size threshold, code type determiner 500 may look at a portion of TCE code 530, may inspect the memory defined and used in that portion of TCE code 530, may compare those sizes heuristically to some thresholds, and may act appropriately. The size threshold and/or the degree of parallelism threshold may be automatically set by code type determiner 500 based on a variety of factors, such as a matrix size of each portion of TCE code 530, whether GPU 130 or CPU 140 will execute each portion of TCE code 530 faster, a predetermined degree of parallelism for each portion of TCE code 530, etc. Alternatively, or additionally, the size threshold and/or the degree of parallelism threshold may be manually set and/or adjusted by a user of client device 110.

Code type determiner 500 may determine which portions of TCE code 530 are more efficiently executed by GPU 130 based on the comparisons to the size threshold and/or the degree of parallelism threshold. For example, code type determiner 500 may determine that large-scale numeric functions are more efficiently executed by GPU 130 based on the comparisons. Similarly, code type determiner 500 may determine which portions of TCE code 530 are more efficiently executed by CPU 140 based on the comparisons to the size threshold and/or the degree of parallelism threshold. As further shown in FIG. 5, code type determiner 500 may provide, to GPU compiler 510, the portion(s) of TCE code 530 determined to be more efficiently executed by GPU 130 (as indicated by reference number 550), and may provide, to CPU compiler 520, the portion(s) of TCE code 530 determined to be more efficiently executed by CPU 140 (as indicated by reference number 560).

GPU compiler 510 may include hardware or a combination of hardware and software that may receive portion(s) 550 of TCE code 530, which have been determined to be more efficiently executed by GPU 130 than CPU 140, and may replace portion(s) 550 of TCE code 530 with relevant code that may be executed by GPU 130. In one implementation, GPU compiler 510 may replace portion(s) 550 of TCE code 530 with compiled GPU-executable code 330 (e.g., assembly code that may be understood by GPU 130). In one example, GPU-executable code 330 may be compiled immediately prior to execution by GPU 130. As shown in FIG. 5, GPU compiler 510 may provide GPU-executable code 330 to GPU 130 (e.g., for execution). In one example, GPU compiler 510 may include a compiler that produces assembly code for NVIDIA GPU devices, such as a parallel tread execution (PTX) compiler.

In one example, GPU compiler 510 may directly generate GPU-executable code 330 (e.g., PTX code) on the fly. In contrast, typical arrangements generate C code first, and then generate PTX code from the C code, which may take an inordinate amount of time. Thus, GPU compiler 510 may provide a quicker and easier way for users to produce GPU-executable code 330 than in typical arrangements.

CPU compiler 520 may include hardware or a combination of hardware and software that may receive portion(s) 560 of TCE code 530, which have been determined to be more efficiently executed by CPU 140 than GPU 130. In one implementation, CPU compiler 520 may compile portion(s) 560 of TCE code 530 to produce compiled CPU-executable code 340 (e.g., assembly code that may be understood by CPU 140). As shown in FIG. 5, CPU compiler 520 may provide CPU-executable code 340 to CPU 140 (e.g., for execution).

As further shown in FIG. 5, library 320 may provide library information 570 to GPU 130 and CPU 140. Library information 570 may include, for example, information describing which functions are being used by TCE code 530 (e.g., by GPU-executable code 330 and/or by CPU-executable code 340). GPU 130 and CPU 140 may utilize library information 570 to aid execution of GPU-executable code 330 and CPU-executable code 340, respectively. GPU 130 and CPU 140 may also share information 580 to aid in execution of GPU-executable code 330 and CPU-executable code 340, respectively. Information 580 may include, for example, data utilized by GPU-executable code 330 and CPU-executable code 340 during execution.

The arrangement depicted in FIG. 5 may enable portions of a program (e.g., portions of TCE code 530 that are more efficiently executed by GPU 130) to be transformed into program code that may be executed by GPU 130. The arrangement may also enable other portions of the program (e.g., portions of TCE code 530 that are more efficiently executed by CPU 140) to remain intact for execution by CPU 140. Such an arrangement may recognize different portions of the program and compile them appropriately, and may replace a set of CPU calls (e.g., portions of TCE code 530 that are more efficiently executed by GPU 130) with GPU calls that are identical in behavior, yet are executed faster by GPU 130.

Although FIG. 5 shows example functional components of execution engine 440, in other implementations, execution engine 440 may include fewer functional components, different functional components, differently arranged functional components, and/or additional functional components than depicted in FIG. 5. Alternatively, or additionally, one or more functional components of execution engine 440 may perform one or more other tasks described as being performed by one or more other functional components of execution engine 440.

Figure 6:
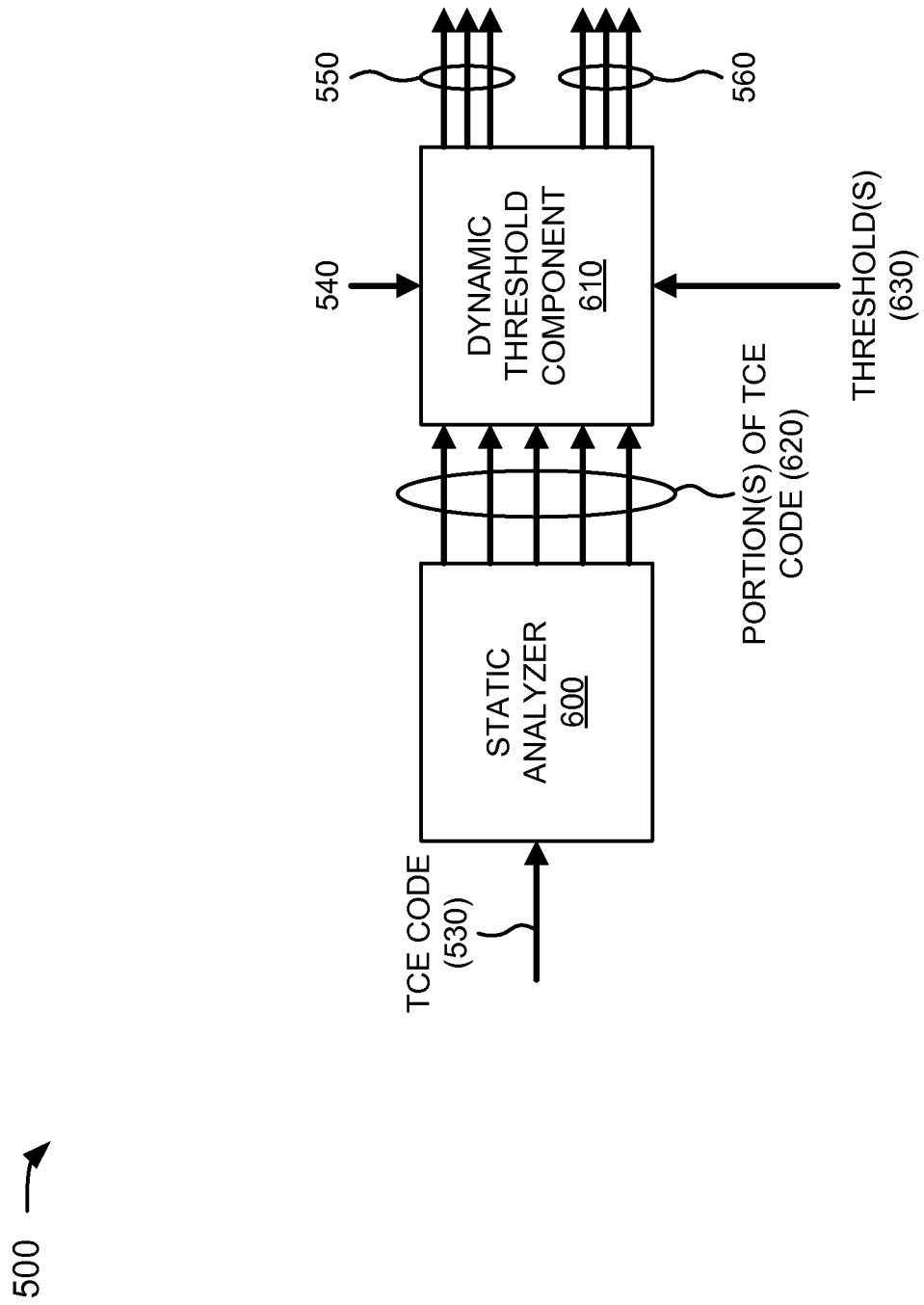
FIG. 6 is a diagram of example functional components of a code type determiner depicted in FIG. 5.

FIG. 6 is a diagram of example functional components of code type determiner 500 of execution engine 440. In one implementation, the functions described in connection with FIG. 6 may be performed by one or more components of device 200 (FIG. 2). As shown in FIG. 6, code type determiner 500 may include a static analyzer 600 and a dynamic threshold component 610.

Static analyzer 600 may include hardware or a combination of hardware and software that may receive TCE code 530, and may utilize a static analysis (e.g., an abstract syntax tree) to break TCE code 530 into recognizable portions. For example, as shown in FIG. 6, static analyzer 600 may utilize the static analysis to break TCE code 530 into portion(s) of TCE code, as indicated by reference number 620. Static analyzer 600 may provide portion(s) 620 of TCE code 530 to dynamic threshold component 610.

Dynamic threshold component 610 may include hardware or a combination of hardware and software that may receive portion(s) 620 of TCE code 530 from static analyzer 600, may receive input size/type information 540 (e.g., from library 320), and may receive one or more thresholds 630. Threshold (s) 630 may include the size threshold and/or the degree of parallelism threshold described above in connection with FIG. 5. Dynamic threshold component 610 may utilize input size/type information 540 and threshold(s) 630 to determine if a portion 620 of TCE code 530 is more efficiently executed by GPU 130 or more efficiently executed by CPU 140. In one implementation, dynamic threshold component 610 may retrieve input size/type information 540 and threshold(s) 630 from a data store, such as a file or a data structure.

In one example implementation, dynamic threshold component 610 may compare a size (e.g., of variables) of each portion 620 of TCE code 530 to the size threshold, and may compare a degree of parallelism of each portion 620 of TCE code 530 to the degree of parallelism threshold. Dynamic threshold component 610 may determine which portions 620 of TCE code 530 are more efficiently executed by GPU 130, or more efficiently executed by CPU 140, based on the comparisons to the size threshold and/or the degree of parallelism threshold. As further shown in FIG. 6, dynamic threshold component 610 may output portion(s) 550 of TCE code 530 determined to be more efficiently executed by GPU 130, and may output portion(s) 560 of TCE code 530 determined to be more efficiently executed by CPU 140. Portion(s) 550 of TCE code 530 may be provided to GPU compiler 510, and portion (s) 560 of TCE code 530 may be provided to CPU compiler 520.

Although FIG. 6 shows example functional components of code type determiner 500, in other implementations, code type determiner 500 may include fewer functional components, different functional components, differently arranged functional components, and/or additional functional components than depicted in FIG. 6. Alternatively, or additionally, one or more functional components of code type determiner 500 may perform one or more other tasks described as being performed by one or more other functional components of code type determiner 500.

Example Program Code

Figure 7:
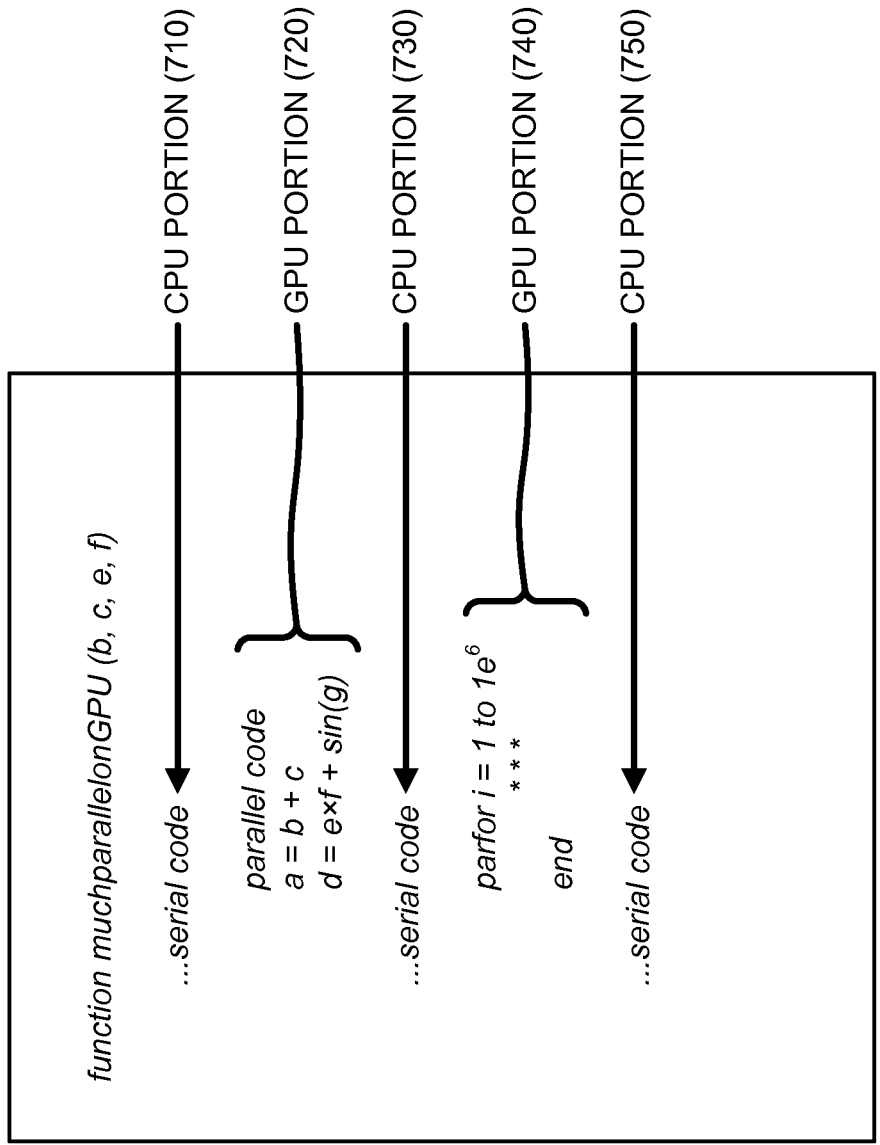
FIG. 7 is a diagram of example program code that may be implemented by the execution engine of FIGS. 4 and 5.

FIG. 7 is a diagram of example program code 700 that may be implemented by execution engine 440. In one implementation, program code 700 may include portions of program code (e.g., TCE code 530) created using a TCE. As shown in FIG. 7, program code 700 may include a portion 710 (e.g., serial code) that may be more efficiently executed by CPU 140, and may include a portion 720 (e.g., parallel code) that may be more efficiently executed by GPU 130. Program code 700 may include other portions 730 and 750 (e.g., serial code) that may be more efficiently executed by CPU 140, and may include another portion 740 (e.g., parallel-for code) that may be more efficiently executed by GPU 130.

In one implementation, execution engine 440 (e.g., code type determiner 500) may determine that portions 710, 730, and 750 of program code 700 are more efficiently executed by CPU 140, and may provide portions 710, 730, and 750 of program code 700 to CPU 140 for execution. Execution engine 440 (e.g., code type determiner 500) may determine that portions 720 and 740 of program code 700 are more efficiently executed by GPU 130, and may provide portions 720 and 740 of program code 700 to GPU 130 for execution.

Although FIG. 7 shows example instructions of program code 700, in other implementations, program code 700 may include fewer instructions, different instructions, differently arranged instructions, and/or additional instructions than depicted in FIG. 7.

Example Process

Figure 8:
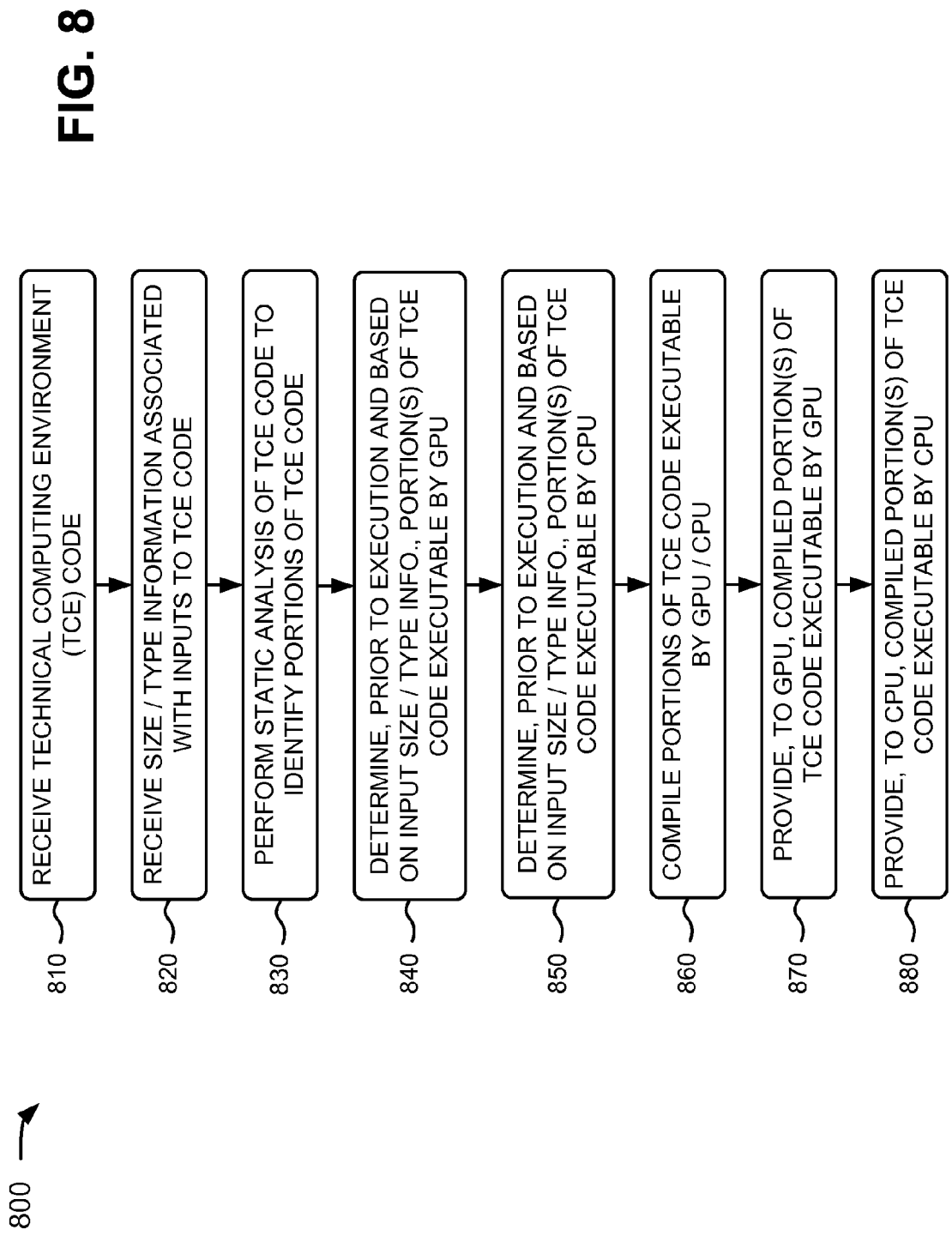
FIGS. 8-10 are flow charts of an example process for identifying and translating program code executable by a GPU according to implementations described herein.
Figure 9:
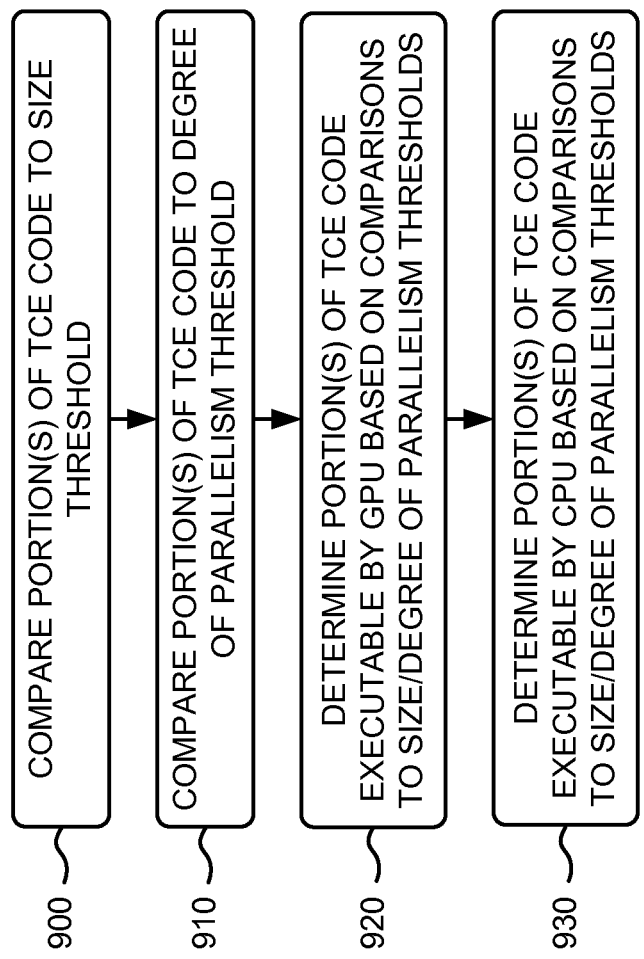
Figure 10:
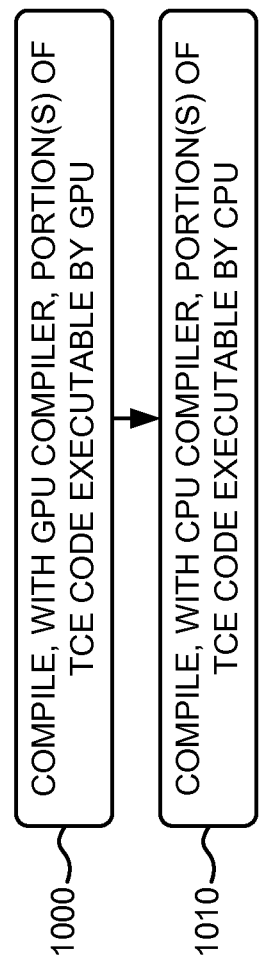

FIGS. 8-10 are flow charts of an example process 800 for identifying and translating program code executable by a GPU according to implementations described herein. In one implementation, process 800 may be performed by client device 110. In other implementations, process 800 may be performed by another device or a group of devices separate from or including client device 110.

As shown in FIG. 8, process 800 may include receiving technical computing environment (TCE) code (block 810), and receiving size and/or type information associated with inputs to the TCE code (block 820). For example, in implementations described above in connection with FIG. 5, code type determiner 500 of client device 110 may receive TCE code 530 (e.g., generated by TCE 310) and may receive, from library 320, size and/or type information 540 associated with input variables of TCE code 530. TCE code 530 may be program code that includes portion(s) more efficiently executed by GPU 130 and portion(s) more efficiently executed by CPU 140. In one example, input size/type information 540 may include inputs to functions of TCE code 530.

As further shown in FIG. 8, process 800 may include performing a static analysis of the TCE code to identify portions of the TCE code (block 830), and determining, prior to execution and based on the input size/type information, portion(s) of the TCE code that are more efficiently executed by a GPU (block 840). For example, in implementations described above in connection with FIG. 5, code type determiner 500 may determine which portions of TCE code 530 are more efficiently executed by GPU 130, and may make this determination prior to execution of TCE code 530. In one example, code type determiner 500 may utilize a static analysis (e.g., an abstract syntax tree to break TCE code 530 into recognizable portions) and input size/type information 540 to determine if a portion of TCE code 530 is more efficiently executed by GPU 130.

Returning to FIG. 8, process 800 may include determining, prior to execution and based on the input size/type information, portion(s) of the TCE code that are more efficiently executed by a CPU (block 850), and compiling the portions of the TCE code that are executable by the GPU and the CPU (block 860). For example, in implementations described above in connection with FIG. 5, code type determiner 500 may determine which portions of TCE code 530 are more efficiently executed by CPU 140, and may make this determination prior to execution of TCE code 530. In one example, code type determiner 500 may utilize a static analysis (e.g., an abstract syntax tree to break TCE code 530 into recognizable portions) and input size/type information 540 to determine if a portion of TCE code 530 is more efficiently executed by CPU 140. Code type determiner 500 may provide, to GPU compiler 510, the portion(s) of TCE code 530 determined to be more efficiently executed by GPU 130 (as indicated by reference number 550), and may provide, to CPU compiler 520, the portion(s) of TCE code 530 determined to be more efficiently executed by CPU 140 (as indicated by reference number 560). GPU compiler 510 may receive portion(s) 550 of TCE code 530, and may replace portion(s) 550 of TCE code 530 with compiled GPU-executable code 330 (e.g., assembly code that may be understood by GPU 130). CPU compiler 520 may receive portion(s) 560 of TCE code 530, and may compile portion(s) 560 of TCE code 530 to produce compiled CPU-executable code 340 (e.g., assembly code that may be understood by CPU 140).

As further shown in FIG. 8, process 800 may include providing, to the GPU, the compiled portion(s) of the TCE code executable by the GPU (block 870), and providing, to the CPU, the compiled portion(s) of the TCE code executable by the CPU (block 880). For example, in implementations described above in connection with FIG. 5, GPU compiler 510 may provide GPU-executable code 330 to GPU 130 (e.g., for execution). CPU compiler 520 may provide CPU-executable code 340 to CPU 140 (e.g., for execution).

Process blocks 840/850 may include the process blocks depicted in FIG. 9. As shown in FIG. 9, process blocks 840/850 may include comparing portion(s) of the TCE code to a size threshold (block 900), and comparing portion(s) of the TCE code to a degree of parallelism threshold (block 910). For example, in implementations described above in connection with FIG. 5, code type determiner 500 may compare a size (e.g., of variables) of each portion of TCE code 530 to a size threshold, and may compare a degree of parallelism (e.g., how many parallel constructs are included) of each portion of TCE code 530 to a degree of parallelism threshold. The size threshold and/or the degree of parallelism threshold may be automatically set by code type determiner 500 based on a variety of factors, such as a matrix size of each portion of TCE code 530, whether GPU 130 or CPU 140 will execute each portion of TCE code 530 faster, a predetermined degree of parallelism for each portion of TCE code 530, etc. Alternatively, or additionally, the size threshold and/or the degree of parallelism threshold may be manually set and/or adjusted by a user of client device 110.

As further shown in FIG. 9, process blocks 840/850 may include determining portion(s) of the TCE code executable by the GPU based on the comparisons to the size and degree of parallelism thresholds (block 920), and determining portion(s) of the TCE code executable by the CPU based on the comparisons to the size and degree of parallelism thresholds (block 930). For example, in implementations described above in connection with FIG. 5, code type determiner 500 may determine which portions of TCE code 530 are more efficiently executed by GPU 130 based on the comparisons to the size threshold and/or the degree of parallelism threshold. For example, code type determiner 500 may determine that large-scale numeric functions are more efficiently executed by GPU 130 based on the comparisons. Similarly, code type determiner 500 may determine which portions of TCE code 530 are more efficiently executed by CPU 140 based on the comparisons to the size threshold and/or the degree of parallelism threshold.

Process block 860 may include the process blocks depicted in FIG. 10. As shown in FIG. 10, process block 860 may include compiling, with a GPU compiler, portion(s) of the TCE code executable by the GPU (block 1000), and compiling, with a CPU compiler, portion(s) of the TCE code executable by the CPU (block 1010). For example, in implementations described above in connection with FIG. 5, GPU compiler 510 may receive portion(s) 550 of TCE code 530 more efficiently executed by GPU 130, and may compile portion(s) 550 of TCE code 530 to produce compiled GPU-executable code 330 (e.g., assembly code that may be understood by GPU 130). CPU compiler 520 may receive portion(s) 560 of TCE code 530 more efficiently executed by CPU 140, and may compile portion(s) 560 of TCE code 530 to produce compiled CPU-executable code 340 (e.g., assembly code that may be understood by CPU 140).

Conclusion

Systems and/or methods described herein may identify and translate programming (or program) code executable by a GPU. The program code may include program code generated by a technical computing environment (described herein). The program code may be compiled to an assembly code (e.g., that may be understood by the GPU) that is executed by the GPU with particular thread allocation policies.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a memory to store a plurality of instructions; and
   a processor to execute one or more instructions of the plurality of instructions in the memory to:
   receive program code,
   receive an input size and type information associated with inputs to the program code,
   determine, prior to execution of the program code and based on the input size and the type information, a portion of the program code that is executable by a graphical processing unit (GPU),
   when determining the portion of the program code that is executable by the GPU, the processor is to execute the one or more instructions to:
   compare portions of the program code to a degree of parallelism threshold, and
   determine the portion of the program code that is executable by the GPU based on comparing the portions of the program code to the degree of parallelism threshold,
   determine, prior to execution of the program code and based on the input size and the type information, a portion of the program code that is executable by a central processing unit (CPU),
   the portion of the program code that is executable by the CPU being different than the portion of the program code that is executable by the GPU,
   compile the portion of the program code that is executable by the GPU to create a compiled GPU-executable portion of the program code,
   compile the portion of the program code that is executable by the CPU to create a compiled CPU-executable portion of the program code,
   provide, to the GPU for execution, the compiled GPU-executable portion of the program code, and
   provide, to the CPU for execution, the compiled CPU-executable portion of the program code.

2. The device of claim 1, where the portion of the program code, that is executable by the GPU, includes parallel code, and
   where the portion of the program code, that is executable by the CPU, includes serial code.

3. The device of claim 1, further including:
   the GPU, and
   the CPU.

4. The device of claim 1, where, when determining the portion of the program code that is executable by the CPU, the processor is to execute the one or more instructions to:
   compare a plurality of portions of the program code to a size threshold, and
   determine the portion of the program code that is executable by the CPU based on comparing the plurality of portions of the program code to the size threshold.

5. A non-transitory computer-readable medium storing instructions, the instructions comprising:
   one or more instructions which, when executed by a computing device, cause the computing device to receive a program;
   one or more instructions which, when executed by the computing device, cause the computing device to receive an input size and type information associated with inputs to the program;
   one or more instructions which, when executed by the computing device, cause the computing device to determine, based on the input size and the type information, a first portion of the program and a second portion of the program,
the first portion of the program being different than the second portion of the program,
the one or more instructions to determine the first portion of the program and the second portion of the program including:
one or more instructions to compare portions of the program to a degree of parallelism threshold, and
one or more instructions to determine the first portion of the program and the second portion of the program based on comparing the portions of the program to the degree of parallelism threshold;
one or more instructions which, when executed by the computing device, cause the computing device to compile the first portion of the program to create a compiled first portion of the program;
one or more instructions which, when executed by the computing device, cause the computing device to compile the second portion of the program to create a compiled second portion of the program,
the second portion of the program being compiled for execution by first hardware that is different than second hardware for which the first portion of the program is compiled; and
one or more instructions which, when executed by the computing device, cause the computing device to provide for execution:
the compiled first portion of the program, and
the compiled second portion of the program.

6. The non-transitory computer-readable medium of claim 5, where the first portion of the program is executable by a graphical processing unit (GPU), and
where the second portion of the program is executable by a central processing unit (CPU).

7. The non-transitory computer-readable medium of claim 5, where the one or more instructions which cause the computing device to compile the first portion of the program include:
one or more instructions which, when executed by the computing device, cause the computing device to compile the first portion of the program using a graphical processing unit (GPU) compiler, and
where the one or more instructions which cause the computing device to compile the second portion of the program include:
one or more instructions which, when executed by the computing device, cause the computing device to compile the second portion of the program using a central processing unit (CPU) compiler.

8. The non-transitory computer-readable medium of claim 5, where the one or more instructions which cause the computing device to provide the compiled first portion of the program and the compiled second portion of the program for execution include:
one or more instructions which, when executed by the computing device, cause the computing device to provide the compiled first portion of the program to a graphical processing unit (GPU) for execution.

9. The non-transitory computer-readable medium of claim 5, where the one or more instructions which cause the computing device to provide the compiled first portion of the program and the compiled second portion of the program for execution include:
one or more instructions which, when executed by the computing device, cause the computing device to provide the compiled second portion of the program to a central processing unit (CPU) for execution.

10. The non-transitory computer-readable medium of claim 5, where the instructions further comprise:
one or more instructions which, when executed by the computing device, cause the computing device to perform a static analysis of the program to identify a plurality of portions of the program, and
where the one or more instructions to determine the first portion of the program and the second portion of the program further include:
one or more instructions to compare the plurality of portions of the program to a size threshold; and
one or more instructions to determine the first portion of the program and the second portion of the program based on comparing the plurality of portions of the program to the size threshold.

11. The non-transitory computer-readable medium of claim 5, where the instructions further comprise:
one or more instructions which, when executed by the computing device, cause the computing device to perform a static analysis of the program to identify the portions of the program.

12. The non-transitory computer-readable medium of claim 5, where the first portion of the program includes parallel code,
where the second portion of the program includes serial code, and
where the one or more instructions which cause the computing device to provide the compiled first portion of the program and the compiled second portion of the program for execution include:
one or more instructions to provide the compiled first portion of the program to a graphical processing unit (GPU) for execution; and
one or more instructions to provide the compiled second portion of the program to a central processing unit (CPU) for execution.

13. A method comprising:
receiving a program,
the receiving the program being performed by a computing device;
receiving an input size and type information associated with inputs to the program,
the receiving the input size and the type information being performed by the computing device;
determining, prior to execution of the program and based on the input size and the type information, a first portion of the program,
the determining the first portion of the program being performed by the computing device,
determining the first portion of the program including:
comparing portions of the program to a degree of parallelism threshold, and
determining the first portion of the program based on comparing the portions of the program to the degree of parallelism threshold;
determining, prior to execution of the program and based on the input size and the type information, a second portion of the program,
the determining the second portion of the program being performed by the computing device,
the second portion of the program being different than the first portion of the program,
the second portion of the program being identified for first hardware different than second hardware identified for the first portion of the program;

compiling, using a first compiler, the first portion of the program to create a compiled first portion of the program,
the compiling the first portion of the program being performed by the computing device;
compiling, using a second compiler, the second portion of the program to create a compiled second portion of the program,
the second compiler being different than the first compiler,
the compiling the second portion of the program being performed by the computing device; and
providing, for execution, the compiled first portion of the program and the compiled second portion of the program,
the providing being performed by the computing device.

14. The method of claim 13, where the first portion of the program includes parallel code, and
where the second portion of the program includes serial code.

15. The method of claim 13, where the first portion of the program is executable by a graphical processing unit (GPU), and
where providing the compiled first portion of the program and the compiled second portion of the program for execution includes:
providing the compiled first portion of the program to the GPU for execution.

16. The method of claim 13, where the second portion of the program is executable by a central processing unit (CPU), and
where providing the compiled first portion of the program and the compiled second portion of the program for execution includes:
providing the compiled second portion of the program to the CPU for execution.

17. The method of claim 13, where determining the second portion of the program includes:
comparing portions of the program to a size threshold; and
determining the second portion of the program based on comparing the portions of the program to the size threshold.

18. The method of claim 13, where providing the compiled first portion of the program and the compiled second portion of the program for execution includes:
providing, for execution, the compiled first portion of the program to a graphical processing unit (GPU) of the computing device; and
providing, for execution, the compiled second portion of the program to a central processing unit (CPU) of the computing device.

19. The method of claim 13, further comprising:
performing a static analysis of the program to identify the portions of the program.

20. The device of claim 1, where the processor is to execute the one or more instructions further to:
perform a static analysis of the program code to identify the portions of the program code.

* * * * *